(12) United States Patent
Kamata et al.

(10) Patent No.: US 8,882,160 B2
(45) Date of Patent: Nov. 11, 2014

(54) LATCH DEVICE

(75) Inventors: Kiyohiko Kamata, Kanagawa (JP);
Naoya Seto, Kanagawa (JP)

(73) Assignee: Mitsui Kinzoku Act Corporation,
Yokohama-shi (JP)

( * ) Notice: Subject to any disclaimer, the term of this patent is extended or adjusted under 35 U.S.C. 154(b) by 646 days.

(21) Appl. No.: 13/107,215

(22) Filed: May 13, 2011

(65) Prior Publication Data

US 2011/0304160 A1 Dec. 15, 2011

(30) Foreign Application Priority Data

Jun. 9, 2010 (JP) ................................. 2010-132398

(51) Int. Cl.
*E05C 3/06* (2006.01)
*B60N 2/36* (2006.01)
*E05C 3/16* (2006.01)

(52) U.S. Cl.
CPC ............... *B60N 2/366* (2013.01); *Y10S 292/23* (2013.01)
USPC .................. 292/216; 292/DIG. 23; 296/65.03

(58) Field of Classification Search
USPC .......................... 292/216, DIG. 23; 296/65.03
See application file for complete search history.

(56) References Cited

U.S. PATENT DOCUMENTS

| | | | | |
|---|---|---|---|---|
| 5,730,480 A * | 3/1998 | Takamura | ................... | 248/503.1 |
| 6,485,071 B2 * | 11/2002 | Schwaiger | ..................... | 292/216 |
| 6,547,291 B1 * | 4/2003 | Schwaiger | ..................... | 292/216 |
| 6,629,710 B1 * | 10/2003 | Shafry et al. | ................... | 292/216 |
| 6,908,137 B2 * | 6/2005 | Doxey et al. | ................ | 296/65.16 |
| 6,945,585 B1 * | 9/2005 | Liu et al. | ..................... | 296/65.03 |
| 7,243,974 B2 * | 7/2007 | Kondo et al. | ................ | 296/65.03 |
| 7,575,280 B2 * | 8/2009 | Palomba et al. | ............... | 297/336 |
| 7,926,858 B2 * | 4/2011 | Otsuka | .......................... | 292/216 |
| 8,128,135 B2 * | 3/2012 | Maeta et al. | ................... | 292/216 |
| 8,282,141 B2 * | 10/2012 | Paing et al. | .................... | 292/216 |
| 8,333,530 B2 * | 12/2012 | Omori | ........................... | 403/330 |
| 8,511,723 B2 * | 8/2013 | Otsuka | .......................... | 292/216 |
| 2005/0104384 A1 * | 5/2005 | Kondo et al. | ................. | 292/240 |
| 2005/0269854 A1 * | 12/2005 | Lutzka et al. | ............ | 297/378.13 |
| 2007/0080554 A1 * | 4/2007 | Willing et al. | .............. | 296/65.03 |
| 2009/0056393 A1 * | 3/2009 | Otsuka | ............................ | 70/205 |
| 2010/0026013 A1 * | 2/2010 | Otsuka et al. | ................. | 292/121 |
| 2010/0032967 A1 * | 2/2010 | Otsuka | .......................... | 292/240 |

FOREIGN PATENT DOCUMENTS

| | | |
|---|---|---|
| JP | 2004-155301 A | 6/2004 |
| JP | 2004-321314 A | 11/2004 |
| JP | 2009-052223 A | 3/2009 |
| JP | 2009-57039 A | 3/2009 |

* cited by examiner

*Primary Examiner* — Carlos Lugo
(74) *Attorney, Agent, or Firm* — Foley & Lardner LLP

(57) ABSTRACT

A latch device includes a base member that has an entering groove having a deep side wall, a latch including an engaging groove having a restraining wall, and a ratchet that meshes with the latch in a meshed position. The latch device further includes a cam member that rotates the latch to a restrained position. In the restrained position, the cam member abuts against the latch to nip a striker between the deep side wall and the restraining wall. The restraining wall includes an inclined surface approaching the deep side wall toward an inlet side of the engaging groove at least in the meshed position.

1 Claim, 12 Drawing Sheets

RELEASING POSITION

MESHED POSITION

US 8,882,160 B2

LATCH DEVICE

BACKGROUND OF THE INVENTION

1. Field of the Invention

The present invention relates to a latch device, and more particularly to a latch device that is preferable for supporting a backrest of a folding seat such that the backrest is attachable to and detachable from a vehicle body.

2. Description of the Related Art

Conventionally, as a vehicle latch device related to the present invention, there is a latch device shown in FIG. 18. In this conventional latch device, a striker St is restrained by a hook groove Sf formed in a hook F and by a wall surface Fb on a deep side of a base groove Sb into which the striker St formed on a base B enters. With the configuration of this conventional latch device, it is possible to suppress noises generated when the striker St collides against the base groove Sb by vibration caused by running of a vehicle (see, for example, Japanese Patent Application Laid-open No. 2009-57039).

According to the latch device disclosed in Japanese Patent Application Laid-open No. 2009-57039, as shown in FIGS. 18 and 19, the wall surface Fb of the base groove Sb is inclined at an angle θ2 with respect to a direction X that is perpendicular to an entering direction Y where the striker St enters into the base groove Sb, and the wall surface Fb is formed into a convex shape. Further, the hook F is formed into a convex shape, and a restraint surface Fc of the hook groove Sf that restrains the striker St together with the wall surface Fb is inclined at an angle θ3 (<θ2) with respect to the direction X.

Accordingly, the striker St is restrained by the wall surface Fb and the restraint surface Fc at a stable position Ps of a portion of the wall surface Fb projecting upward in FIGS. 18 and 19 and of a portion of the restraint surface Fc projecting upward in these drawings.

When the latch device described in Japanese Patent Application Laid-open No. 2009-57039 is mounted on a backrest of a folding seat and is used, if the vehicle is suddenly decelerated or has a collision, an impact force in a releasing direction is applied from the striker St to the hook F in a direction opposite from the entering direction Y. The hook F is rotated by this impact force in a counterclockwise direction shown with an arrow Af in FIG. 18. At the same time, because the restraint surface Fc projects upward as shown in FIG. 19, responses with respect to the applied impact force are fluctuated, and the striker St tends to move rightward or leftward shown with arrows in FIG. 19 along the restraint surface Fc.

Therefore, in the latch device described in Japanese Patent Application Laid-open No. 2009-57039, the striker St moves to various positions in the hook groove Sf by the applied impact force and thus its moving direction is unstable. Therefore, according to the latch device of Japanese Patent Application Laid-open No. 2009-57039, even if applied impact forces have the same magnitude, because the distance between the hook F and the striker St differs depending on a moving position of the striker St in the hook groove Sf, there is a possibility that the strength of the latch device is fluctuated.

SUMMARY OF THE INVENTION

According to an aspect of the present invention, a latch device includes: a latch that is rotatably supported by a base member, an entering groove having a deep side wall on a deep side in an entering direction into which a striker enters is formed in the base member, an engaging groove with which the striker engages is formed in the latch, and the latch engages with the striker, thereby rotating the latch from a releasing position to a meshed position where the engaging groove intersects with the entering groove; a ratchet that is rotatably supported by the base member and meshes with the latch in the meshed position, thereby preventing the latch from rotating in a releasing direction; a cam member that is rotatably supported by the base member and rotates the latch to a restrained position where the cam member abuts against the latch to nip the striker between the deep side wall and the engaging groove, thereby restraining the striker. A distance between the deep side wall and the engaging groove at least in the meshed position becomes narrower toward an inlet side of the engaging groove.

Advantageously, in the latch device, a distance between the deep side wall and the engaging groove in the meshed position is largest between an inlet side and a deep side of the engaging groove.

Advantageously, in the latch device, a wall of the engaging groove is opposed to the deep side wall at the meshed position, the striker abuts against the wall of the engaging groove, and the wall of the engaging groove has such a shape that the wall is most separated from the deep side wall between an inlet side and a deep side of the engaging groove.

Advantageously, in the latch device, a first shaft hole is formed in one end of the ratchet, and a locking hole is formed in the other end of the ratchet, a second shaft hole is formed in one end of the cam member, a cam face that abuts against the latch is formed on the other end of the cam member, and an opening is formed between the second shaft hole and the cam face, an operating opening is formed in the base member, an operating rod is locked in the locking hole through the opening, thereby rotating and operating the ratchet, and an end of the operating rod is inserted through the operating opening, the ratchet and the cam member are located such that the locking hole of the ratchet and the opening of the cam member are superposed on each other, and the ratchet and the cam member are supported on the base member by shaft members that are inserted through the shaft holes.

DETAILED DESCRIPTION OF THE PREFERRED EMBODIMENTS

Exemplary embodiments of a latch device according to the present invention will be explained below in detail with reference to the accompanying drawings. The present invention is not limited to the embodiments.

Figure 1:
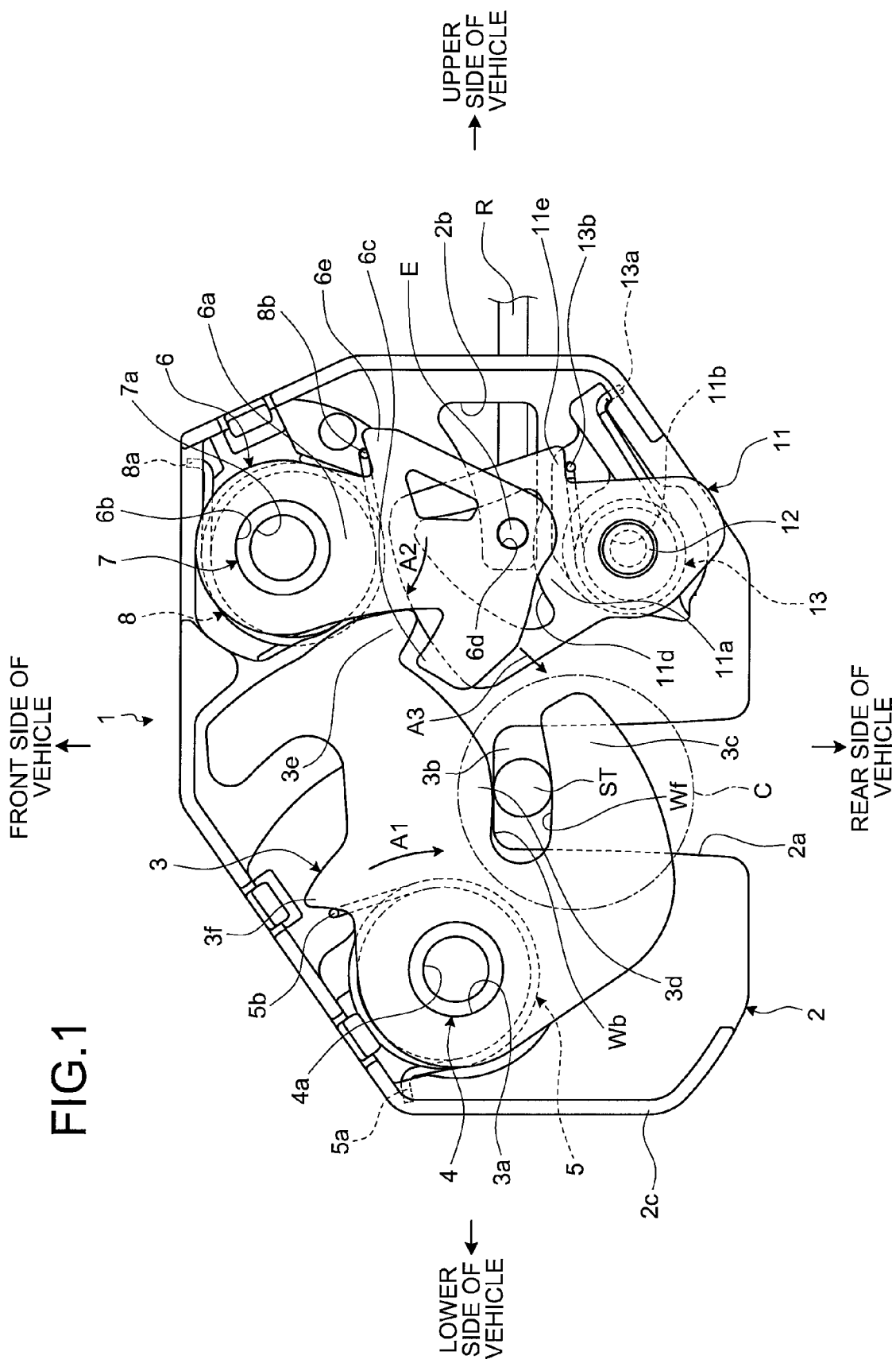
FIG. 1 is a front view of a latch device according to an embodiment of the present invention in which a latch thereof is in a restrained position.
Figure 2:
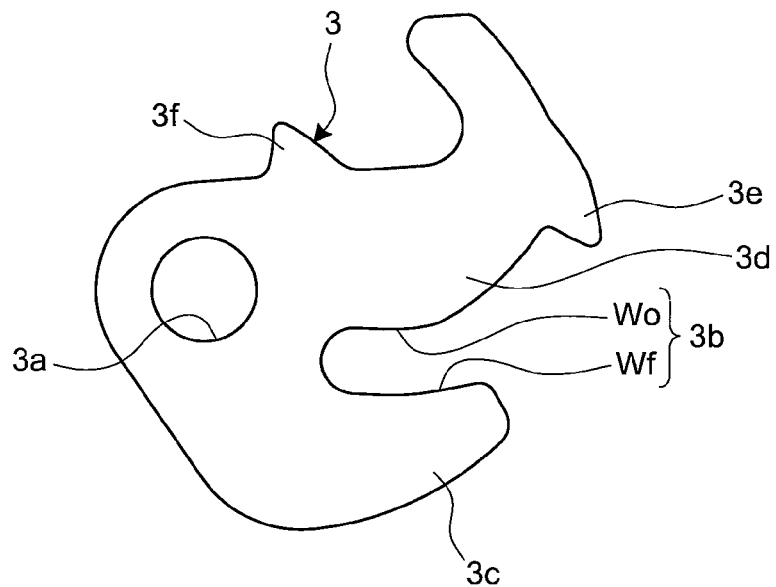
FIG. 2 is a front view of the latch.
Figure 3:
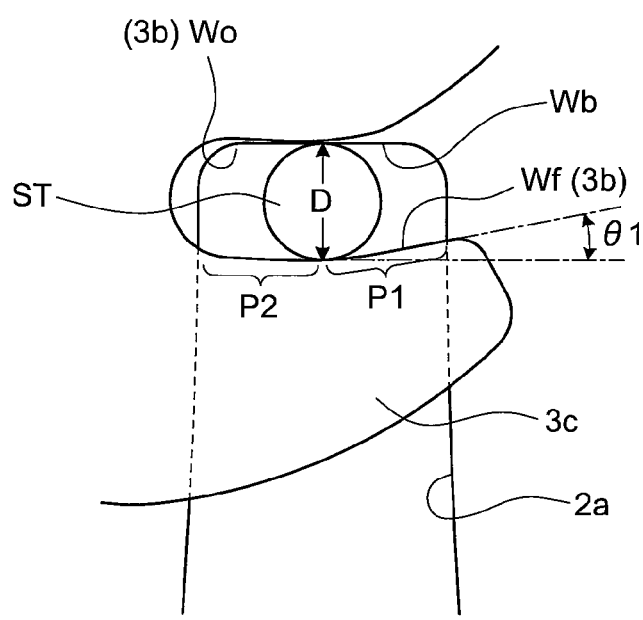
FIG. 3 is an enlarged view of a portion C of the latch device shown in FIG. 1.
Figure 4:
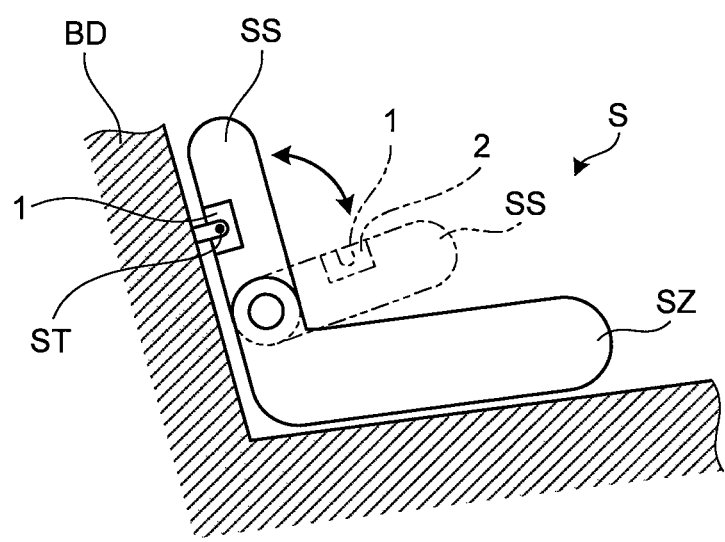
FIG. 4 is a conceptual side view of a vehicle seat to which the latch device shown in FIG. 1 is applied.

FIG. 1 is a front view of a latch device according to an embodiment of the present invention in which a latch thereof is in a restrained position. FIG. 2 is a front view of the latch. FIG. 3 is an enlarged view of an engaging groove of the latch in a portion C shown in FIG. 1. As shown in FIG. 4, the latch device exemplified here is applied to a vehicle seat S in which a backrest portion SS is rotatably supported by a rear end edge of a seating portion SZ. The latch device meshes with a striker ST provided on a vehicle body BD, thereby fixing the backrest portion SS to the vehicle body BD such that the backrest portion SS can be detached from and attached to the vehicle body BD. The latch device is mounted on a guide frame provided on the backrest portion SS.

As shown in FIG. 1, a latch device 1 includes a base plate 2, a latch 3 rotatably supported by the base plate 2, a ratchet 6, and a cam member 11. In the latch device 1 shown in FIG. 1, the latch 3 rotates around a latch shaft 4 (explained later). FIG. 1 depicts a restrained position of the latch 3 where the striker ST is restrained by a deep side wall Wb of an entering groove 2a (explained later) of the base plate 2 and by an engaging groove 3b (explained later) of the latch 3.

The base plate 2 is a substantially rectangular plate-like member made of metal. As shown in FIG. 1, the base plate 2 includes the entering groove 2a into which the striker ST enters and an operating opening 2b. The entering groove 2a includes the deep side wall Wb on a deep side in an entering direction of the striker ST. The deep side wall Wb intersects with a forming direction of the entering groove 2a at right angles. First to third insertion holes (not shown) are formed in the base plate 2 at positions corresponding to turning centers of the latch 3, the ratchet 6, and the cam member 11, respectively.

As shown in FIG. 1, the latch 3 is supported by the latch shaft 4. The latch 3 is a plate-like member that is rotated around the latch shaft 4 by the striker ST that enters into the entering groove 2a of the base plate 2. At this time, the latch 3 is rotated from a released position where the latch 3 does not engage with the striker ST, to a restrained position through a meshed position where the latch 3 engages with the striker ST. As shown in FIG. 2, a shaft hole 3a is formed in the latch 3 at a turning center thereof, and the latch shaft 4 is inserted into the shaft hole 3a. The latch 3 includes the engaging groove 3b that opens at an outer peripheral surface of the latch 3, a hook portion 3c located at a lower portion of the engaging groove 3b, an abutting portion 3d located at an upper portion of the engaging groove 3b, an outer peripheral pawl 3e located at an end of the abutting portion 3d, and a projection 3f located at an upper portion of the abutting portion 3d. The latch 3 is biased by a latch spring 5 around the latch shaft 4 in a clockwise direction shown with an arrow A1 in FIG. 1. One end 5a of the latch spring 5 is locked on the base plate 2, and the other end 5b of the latch spring 5 is locked on the projection 3f, and the latch spring 5 is located on an outer periphery of the latch shaft 4. One end of the latch shaft 4 is mounted on the first insertion hole formed in the base plate 2 and a bolt insertion hole 4a is formed in a shaft center of the latch shaft 4. The latch 3 rotates in the clockwise direction shown with the arrow A1 and this direction is a rotating direction where the engagement between the latch 3 and the striker ST is released. Therefore, in the following descriptions, rotation in the clockwise direction of the latch 3 is called "rotation in the releasing direction".

As shown in FIG. 2, the engaging groove 3b includes a restraining wall Wf that restrains the striker ST between the restraining wall Wf and the deep side wall Wb of the base plate 2, and an opposed wall Wo that is opposed to the restraining wall Wf. As shown in FIG. 3, the restraining wall Wf includes a first regulating unit P1 formed on the side of an inlet of the engaging groove 3b, and a second regulating unit P2 formed on a deep side.

As shown in FIG. 3, the first regulating unit P1 is formed on the side of the inlet of the engaging groove 3b, and includes an inclined surface that is inclined at an angle $\theta 1$ with respect to the second regulating unit P2 such that the inclined surface approaches the deep side wall Wb. Accordingly, in the restrained position of the latch 3, the distance between the deep side wall Wb and the engaging groove 3b becomes narrower toward the inlet of the engaging groove 3b. The first regulating unit P1 regulates such that the distance between the restraining wall Wf and the deep side wall Wb on the side of the inlet of the engaging groove 3b in the restrained position of the latch 3 becomes narrower than a diameter D of the striker ST. With this configuration, the latch device 1 restrains the striker ST between the deep side wall Wb of the entering groove 2a and the engaging groove 3b in the restrained position of the latch 3, and the first regulating unit P1 regulates the movement of the striker ST toward the inlet of the engaging groove 3b.

Figure 5:
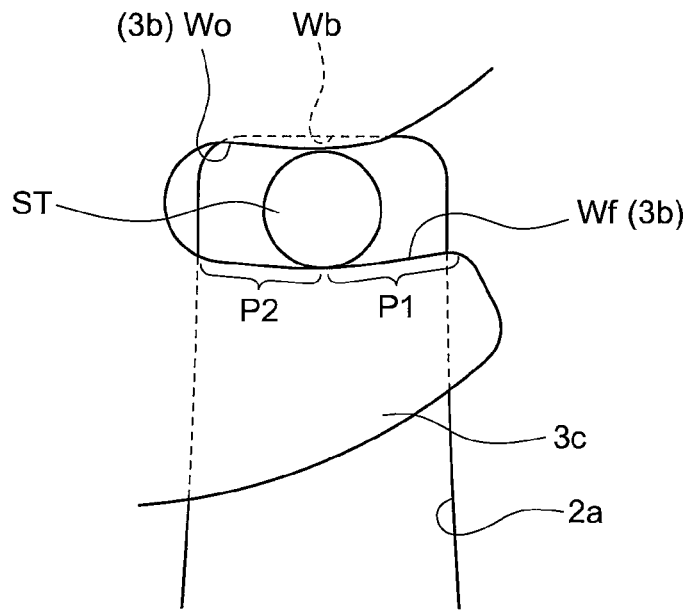
FIG. 5 is an enlarged view of the portion C when the latch of the latch device shown in FIG. 1 is in its meshed position.

FIG. 5 is an enlarged view of an engaging groove of a portion C shown in FIG. 1 in a meshed position of the latch. As shown in FIG. 5, the second regulating unit P2 is an inclined surface formed on the deep side of the engaging groove 3b. The second regulating unit P2 forms a gentle concave portion at an intermediate portion of the restraining wall Wf together with the first regulating unit P1 in the meshed position of the latch 3. Therefore, the distance between the engaging groove 3b and the deep side wall Wb in the meshed position of the latch 3 becomes shorter toward the inlet of the engaging groove 3b. In other words, in the meshed position of the latch 3 shown in FIG. 5, as the first regulating unit P1 approaches the inlet of the engaging groove 3b, the first regulating unit P1 and the second regulating unit P2 become inclined surfaces approaching the deep side wall Wb, and as the second regulating unit P2 approaches the deep side of the engaging groove 3b, the second regulating unit P2 becomes an inclined surface approaching the deep side wall Wb. At the meshed position, the engaging groove 3b intersects with the entering groove 2a at substantially 90 degrees. Therefore, when an impact force is applied from the striker ST to the latch 3 in the releasing direction in the meshed position of the latch 3, the first regulating unit P1 and the second regulating unit P2 regulate the movement of the striker ST toward the inlet of the engaging groove 3b or toward the deep side in the lateral direction in the drawings, and a position of the striker ST is regulated such that the striker ST is located around the central portion of the engaging groove 3b.

Figure 6:
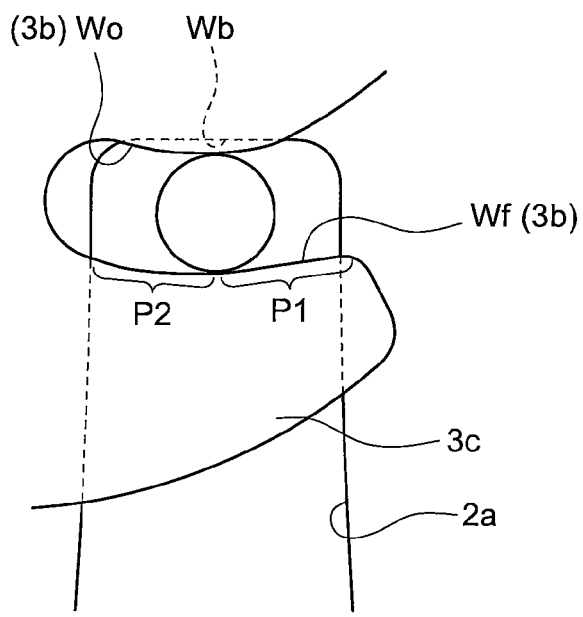
FIG. 6 is an enlarged view of an example of an engaging groove.

At the meshed position, the latch 3 is located at a position where the opposed wall Wo rotates in the releasing direction slightly lower than the deep side wall Wb as compared with the restrained position shown in FIG. 3. If it is possible to regulate the movement of the striker ST toward the inlet or the deep side of the engaging groove 3b, the first regulating unit P1 and the second regulating unit P2 can have curved surfaces as shown in FIG. 6, for example.

Figure 7:
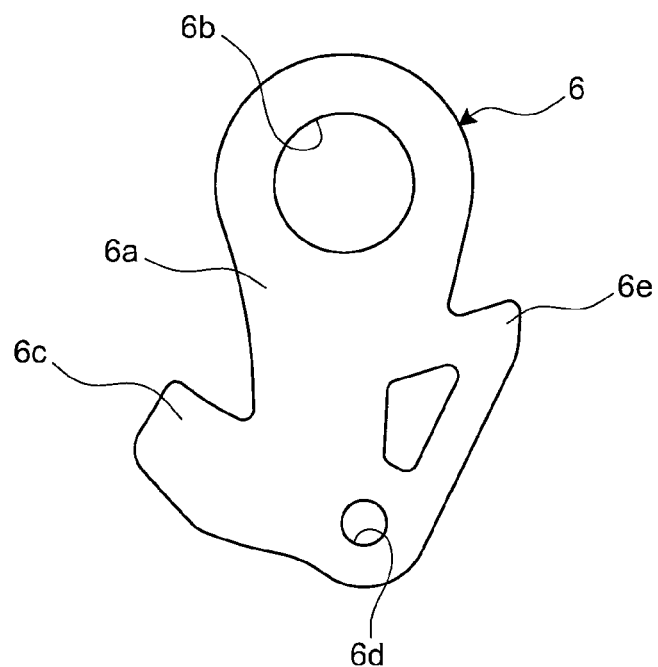
FIG. 7 is a front view of a ratchet.

FIG. 7 is a front view of the ratchet. As shown in FIG. 1, the ratchet 6 is supported by a ratchet shaft 7, and the ratchet 6 is a plate-like member that rotates around the ratchet shaft 7. The ratchet 6 meshes with the latch 3 in the meshed position where the striker ST engages with the engaging groove 3b, and the ratchet 6 prevents the latch 3 from rotating in the releasing direction. As shown in FIG. 7, a shaft hole 6b is formed in one end of a body 6a of the ratchet 6, the ratchet shaft 7 is inserted through the shaft hole 6b, and a meshing portion 6c that meshes with the latch 3 is formed on a side surface of the body 6a on the side of the other end. A locking hole 6d is formed in the body 6a of the ratchet 6 on the side of the other end. The ratchet 6 is biased in the clockwise direction shown with an arrow A2 in FIG. 1 around the ratchet shaft 7 by a ratchet spring 8. One end 8a of the ratchet spring 8 is locked on the base plate 2, and the other end 8b of the ratchet spring 8 is locked on the projection 6e. The ratchet spring 8 is located on an outer periphery of the ratchet shaft 7. One end of the ratchet shaft 7 is mounted on the second insertion hole formed in the base plate 2, and a bolt insertion hole 7a is formed an axial center of the ratchet shaft 7.

Figure 8:
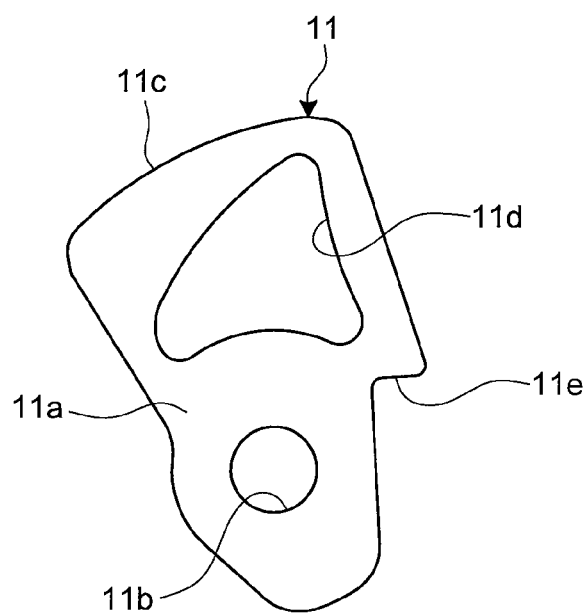
FIG. 8 is a front view of a cam member.

FIG. 8 is a front view of the cam member. As shown in FIG. 1, the cam member 11 is supported by a cam shaft 12, and the cam member 11 is a plate-like member that rotates around the cam shaft 12. The cam member 11 rotates the latch 3 located in the meshed position to the restrained position where the striker ST is restrained by the entering groove 2a of the base plate 2 and the engaging groove 3b of the latch 3. As shown in FIG. 8, a shaft hole 11b is formed in the cam member 11 on the side of one end of a body 11a, the cam shaft 12 is inserted through the shaft hole 11b, and a cam face 11c is formed on the cam member 11 on the side of the other end of the body 11a of the cam member 11. The outer peripheral pawl 3e of the latch 3 abuts against the cam face 11c. An opening 11d is formed in the cam member 11 between the shaft hole 11b of the body 11a and the cam face 11c. The cam member 11 is biased in a counterclockwise direction shown with an arrow A3 in FIG. 1 around the cam shaft 12 by a cam spring 13. One end 13a of the cam spring 13 is locked on the base plate 2, the other end 13b of the cam spring 13 is locked in a locking portion 11e, and the cam spring 13 is located on an outer periphery of the cam shaft 12. A spring force of the cam spring 13 is set to a value such that the cam member 11 can be rotated in the direction of the arrow A3 (see FIG. 1) against a biasing force of the latch 3 caused by the latch spring 5 in the direction of the arrow A1 (see FIG. 1). One end of the cam shaft 12 is mounted on the third insertion hole formed in the base plate 2.

The latch device 1 is assembled in such a manner that when the latch 3, the ratchet 6, and the cam member 11 are mounted on the base plate 2, the other end of the body 6a is superposed on the cam face 11c of the cam member 11 in an axial direction of the cam shaft 12, an operating rod R located on the rear surface side of the base plate 2 is folded at right angles while leaving its end by a length exceeding a thickness of the ratchet 6 and a thickness of the cam member 11, a folded end E folded at right angles is inserted from the operating opening 2b and the opening 11d, and the folded end E is locked in the locking hole 6d of the ratchet 6. The latch device 1 is mounted on a guide frame provided on the backrest portion SS by a bolt that is inserted from a rear surface side of the base plate 2 shown in FIG. 1 through the bolt insertion hole 4a of the latch shaft 4 and the bolt insertion hole 7a of the ratchet shaft 7.

Figure 9:
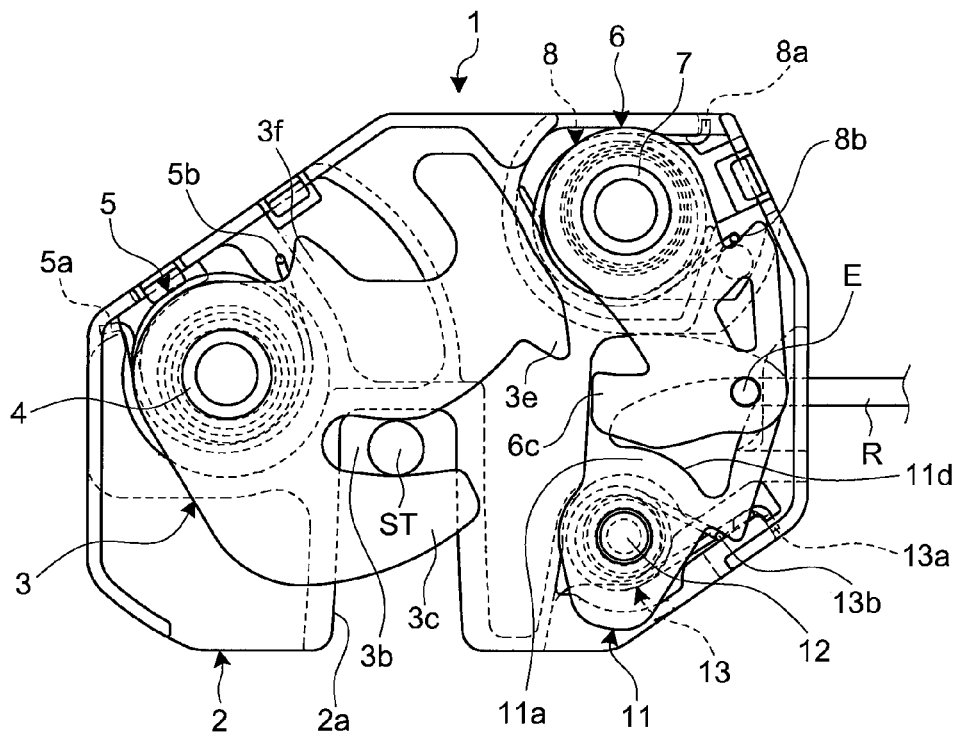
FIG. 9 is a front view of a state where an operating rod of the latch device shown in FIG. 1 is pulled to release a meshed state between the latch and the ratchet.
Figure 10:
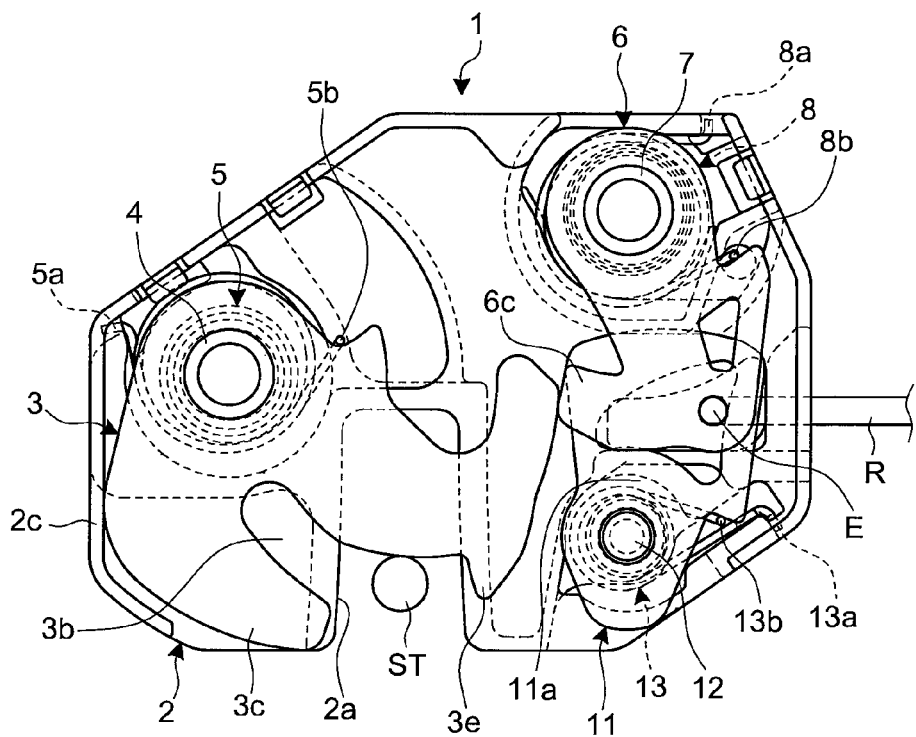
FIG. 10 is a front view of a state where the latch rotates in a releasing direction in the latch device shown in FIG. 9, and engagement between a striker and a striker-engaging groove is released.

The latch device 1 is configured such that when the operating rod R is pulled rightward in FIG. 1, the ratchet 6 first rotates in the counterclockwise direction around the ratchet shaft 7, the cam member 11 rotates in the clockwise direction around the cam shaft 12, and a meshed state between the outer peripheral pawl 3e of the latch 3 and the meshing portion 6c of the ratchet 6 is released as shown in FIG. 9. The latch 3 of the latch device 1 is then rotated in the clockwise direction by a biasing force of the latch spring 5, the latch 3 abuts against a stopper wall 2c as shown in FIG. 10 to prevent the latch 3 from rotating, and the engagement between the striker ST and the engaging groove 3b is released. As a result, the latch device 1 can tilt the backrest portion SS of the vehicle seat S shown in FIG. 4 toward the seating portion SZ.

Figure 11:
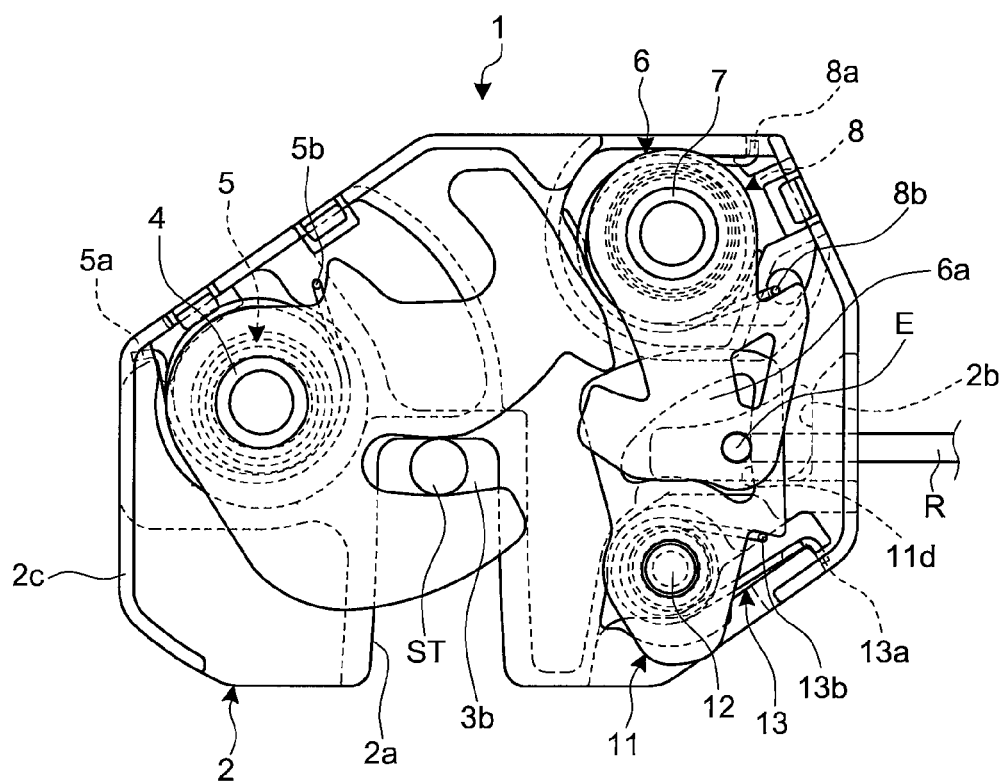
FIG. 11 is a front view for explaining that a timing at which a cam member starts rotating when an operating rod of the latch device shown in FIG. 1 is pulled delays as compared with that of a ratchet.

At this time, the folded end E of the operating rod R is locked in the locking hole 6d of the ratchet 6 through the opening 11d of the cam member 11. Accordingly, when the operating rod R is pulled rightward in FIG. 1, the ratchet 6 first starts rotating in the counterclockwise direction around the ratchet shaft 7, and the folded end E then abuts against an edge of the opening 11d as shown in FIG. 11, and the cam member 11 starts rotating in the clockwise direction. Therefore, a timing at which the cam member 11 starts rotating delays as compared with the ratchet 6. The folded end E of the operating rod R abuts against the edge of the operating opening 2b formed in the base plate 2 and according to this arrangement, a position in the pulling direction is regulated.

Figure 12A:
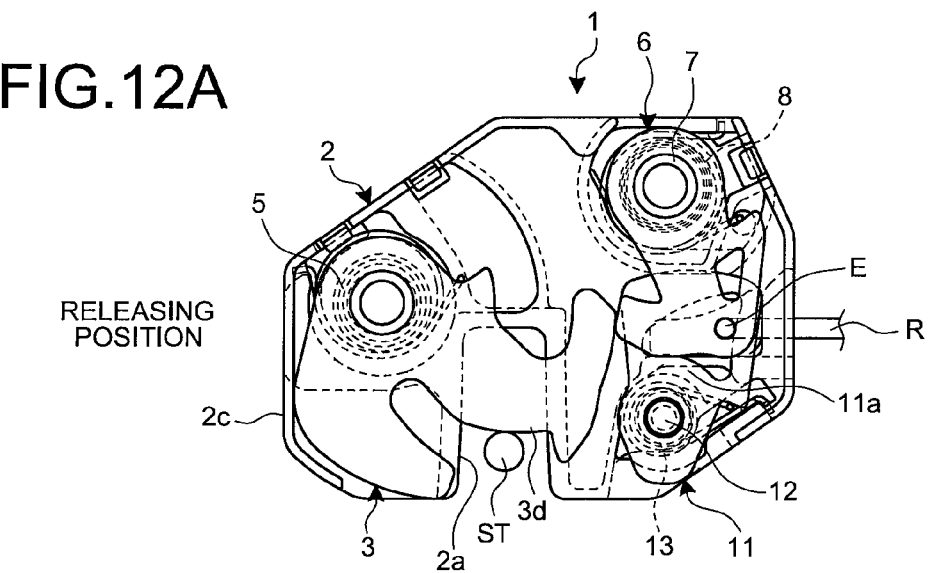
FIGS. 12A to 12C are front views of variations in an engaged state between the latch and the striker of the latch device shown in FIG. 1.
Figure 12B:
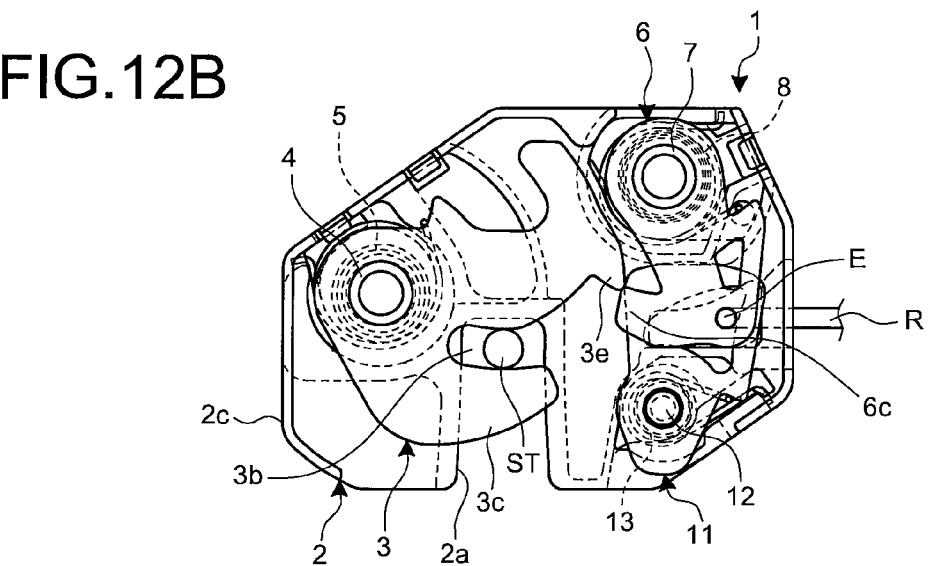
Figure 12C:
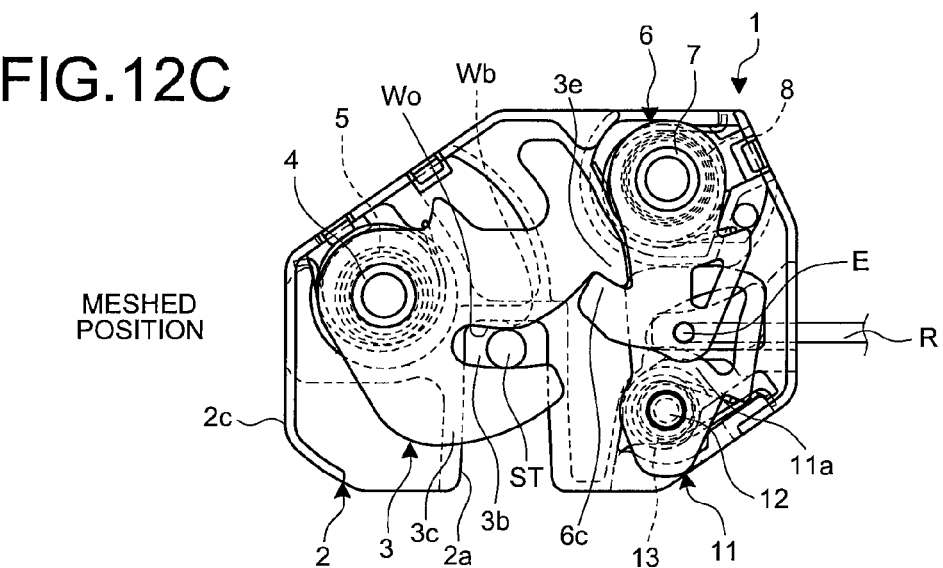

FIGS. 12A to 12C are front views of variations in an engaged state between the latch and the striker of the latch device shown in FIG. 1. In the vehicle seat S shown in FIG. 4, when the backrest portion SS is raised from a tilted state, the striker ST of the latch device 1 enters into the entering groove 2a of the base plate 2, and the striker ST abuts against the abutting portion 3d of the latch 3 as shown in FIG. 12A. In the following descriptions, positions of the latch 3 including a position of the latch 3 shown in FIG. 12A where the striker ST is not engaged with the engaging groove 3b are called "releasing positions".

When the striker ST abuts against the abutting portion 3d and the latch 3 rotates in the counterclockwise direction from a state shown in FIG. 12A against the spring force of the latch spring 5, the hook portion 3c of the latch 3 moves to the deep side of the entering groove 2a while gradually crossing the entering groove 2a as shown in FIG. 12B, the engaging groove 3b intersects with the entering groove 2a as shown in FIG. 12C, and the hook portion 3c occludes the entering groove 2a. At this time, the outer peripheral pawl 3e of the latch 3 meshes with the meshing portion 6c of the ratchet 6 in an intimately contacted state. A position of the latch 3 shown in FIG. 12C is called "meshed position".

As shown in FIGS. 5 and 12C, in the meshed position of the latch 3, there is a slight margin between the opposed wall Wo of the engaging groove 3b and the deep side wall Wb of the entering groove 2a where the latch 3 rotates in the counter-clockwise direction. Therefore, when the latch 3 rotates toward the meshed position shown in FIGS. 5 and 12C, the cam member 11 biased by the cam spring 13 pushes the latch 3 from the meshed position in the counterclockwise direction, and the cam member 11 rotates the latch 3 toward the restrained position shown in FIG. 1. With this configuration, the latch device 1 restrains the striker ST between the deep side wall Wb of the entering groove 2a and the restraining wall Wf of the latch 3.

As a result, the raised state of the backrest portion SS is maintained, and the vehicle seat S can sit on the seating portion SZ. At this time, the latch device 1 restrains the striker ST by the deep side wall Wb of the entering groove 2a and the restraining wall Wf of the latch 3. Therefore, a collision between the striker ST and the entering groove 2a by vibration caused by running of the vehicle is suppressed, and it is possible to suppress noises generated when the striker ST and the entering groove 2a or the latch 3 collide against each other.

Figure 13:
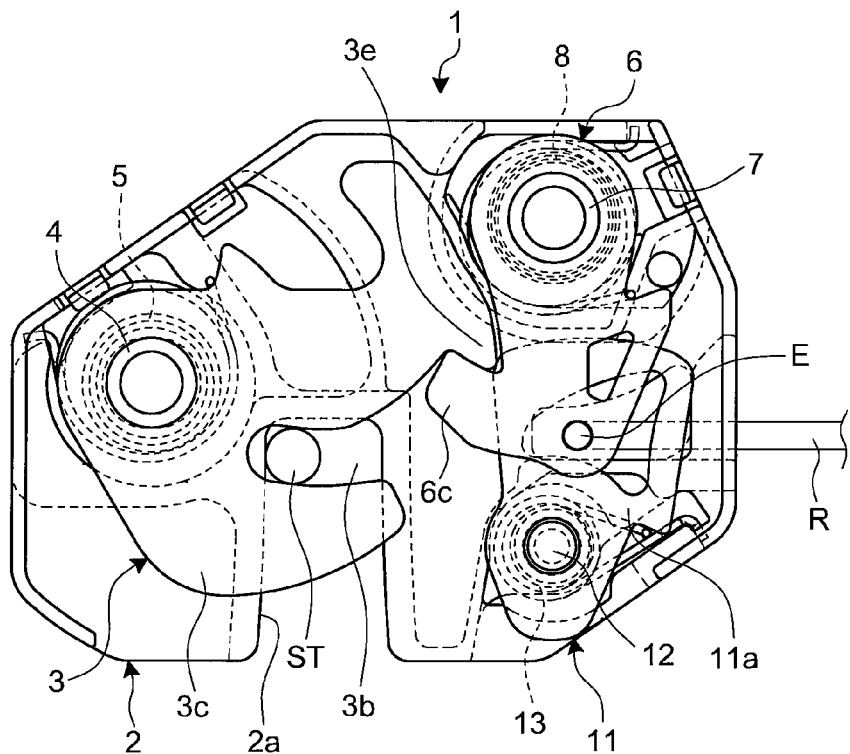
FIG. 13 is a front view of a latch device in which a striker is located on a left side position in an entering groove in a striker-engaging groove in a meshed position of a latch.
Figure 14:
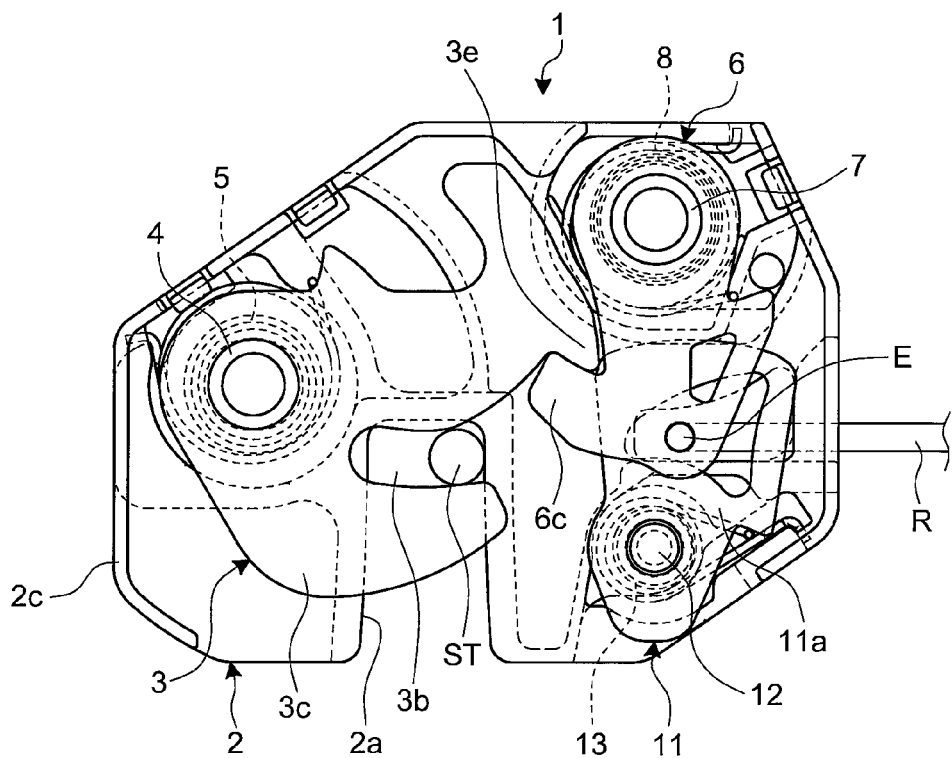
FIG. 14 is a front view of the latch device in which the striker is located on a right side position in the entering groove in the striker-engaging groove in a meshed position of the latch.

When the backrest portion SS is raised, the striker ST is not always located at a central portion of the entering groove 2a in the engaging groove 3b as shown in FIG. 12C in the meshed position of the latch 3. For example, when the backrest portion SS is raised, in the meshed position of the latch 3, the striker ST is located on a left side position in the entering groove 2a in the engaging groove 3b as shown in FIG. 13, or the striker ST is located on a right side position in the entering groove 2a in the engaging groove 3b as shown in FIG. 14 depending on an input position when the backrest portion SS is pulled upward. When the backrest portion SS is raised in this manner, the striker ST is located at various positions in the entering groove 2a in the engaging groove 3b depending on the input position to the backrest portion SS.

Figure 15:
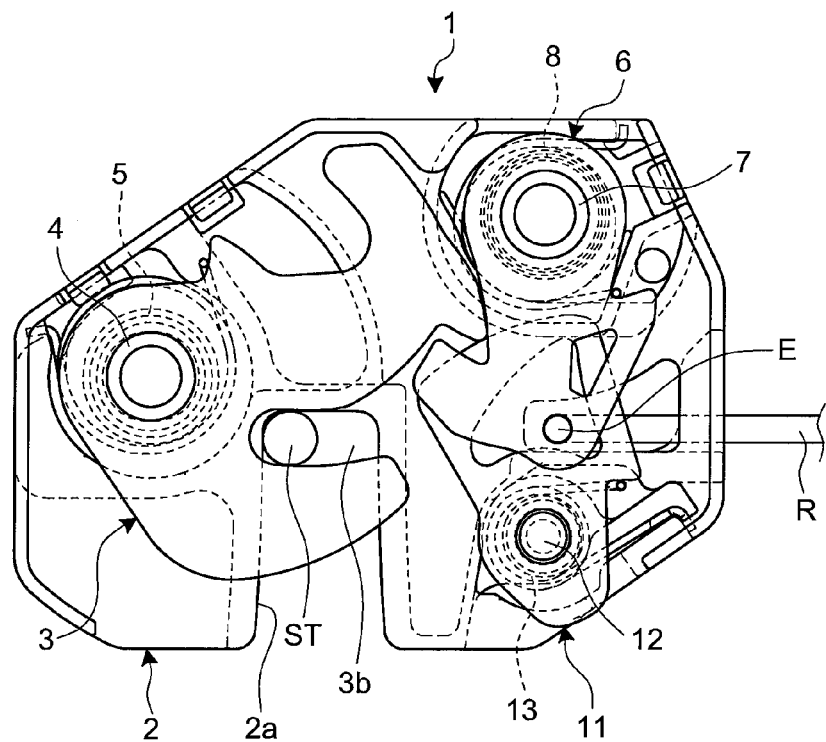
FIG. 15 is a front view of the latch device in which the striker is restrained on a left side position in the entering groove in the striker-engaging groove in a restrained position of the latch.
Figure 16:
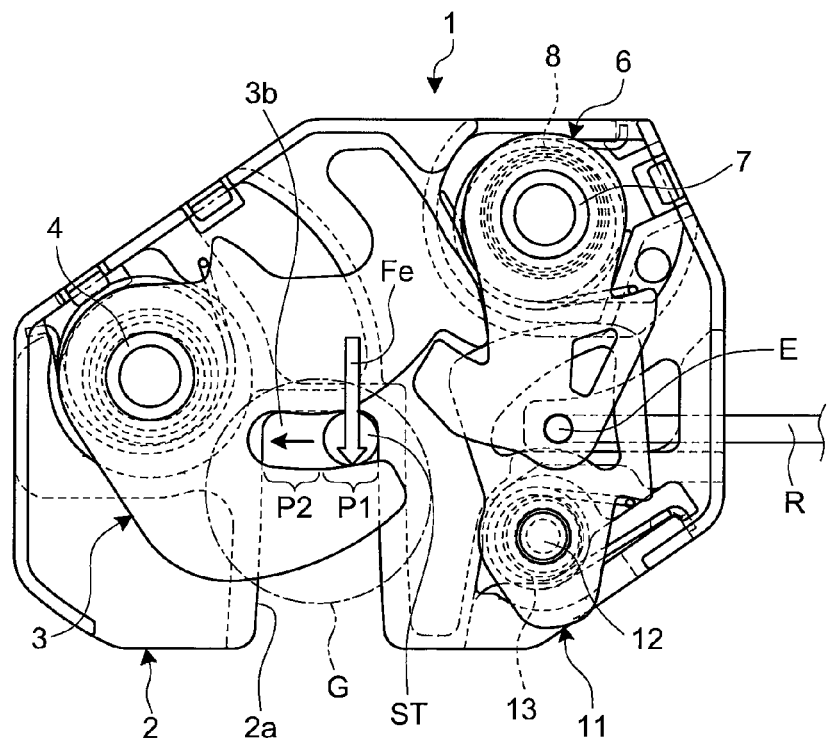
FIG. 16 is a front view of the latch device in which the striker is restrained on a right side position in the entering groove in the striker-engaging groove in a restrained position of the latch.

With this configuration, if the striker ST is located on the left side position in the entering groove 2a in the engaging groove 3b in the meshed position of the latch 3, the striker ST is restrained at the left side position in the entering groove 2a as shown in FIG. 15 even in the restrained position. Similarly, if the striker ST is located on a right side position in the engaging groove 3b in the meshed position of the latch 3, the striker ST is restrained at a right side position in the entering groove 2a as shown in FIG. 16 even in the restrained position.

Assume that a collision of the vehicle occurs when the striker ST is restrained in the right side position in the engaging groove 3b. At this time, an impact force Fe in a releasing direction from the striker ST to the latch 3 is applied as shown with an arrow in FIG. 16 by an inertial force by which backrest portion SS tries to move forward. When the impact force Fe is applied, the latch 3 of the latch device 1 rotates in the clockwise direction while avoiding the cam member 11, and the position of the latch 3 is changed to the meshed position.

At this time, in the restrained position, the first regulating unit P1 is inclined at the angle θ1 with respect to the second regulating unit P2 such that the inlet side of the engaging groove 3b of the latch device 1 approaches the deep side wall Wb (see FIG. 3). Accordingly, when the impact force Fe in the releasing direction is applied from the striker ST to the latch 3 of the latch device 1, the striker ST moves in the engaging groove 3b toward the second regulating unit P2 as shown with the arrow in FIG. 16 in a state where motion of the striker ST is regulated by the first regulating unit P1, and the striker ST rotates the latch 3 in the clockwise direction from the restrained position to the meshed position.

As a result, the striker ST is guided to a location around a central portion of the entering groove 2a in its width direction between the first regulating unit P1 and the second regulating unit P2.

Meanwhile, when the striker ST is restrained at the left side position in the engaging groove 3b in the restrained position as shown in FIG. 15, or when the striker ST is restrained around the central position in the entering groove 2a as shown in FIG. 1, when the impact force Fe in the releasing direction is applied from the striker ST to the latch 3, the striker ST is guided to a location in around the central portion of the entering groove 2a in the width direction in the same manner as that described above. With this configuration, in the latch device 1, the impact force applied in the releasing direction from the striker ST to the latch 3 is always applied to a determined position of the restraining wall Wf. Therefore, when the impact force is applied, it is applied to the same position of the engaging groove 3b, and thus the strength of a seat using the latch device 1 becomes stable.

Figure 17:
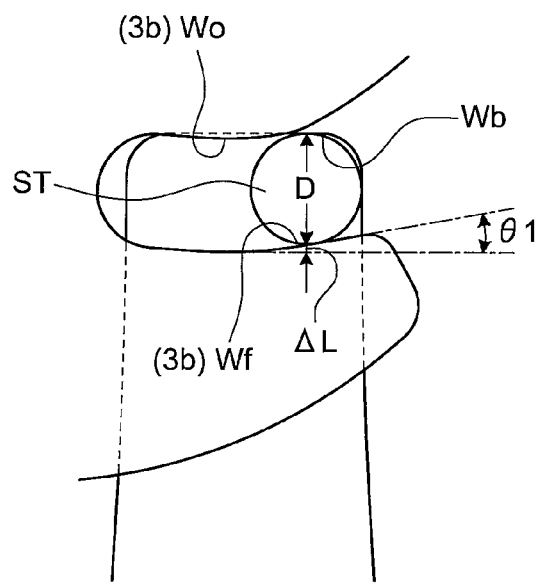
FIG. 17 is an enlarged view of a portion G of the latch device shown in FIG. 16.
Figure 18:
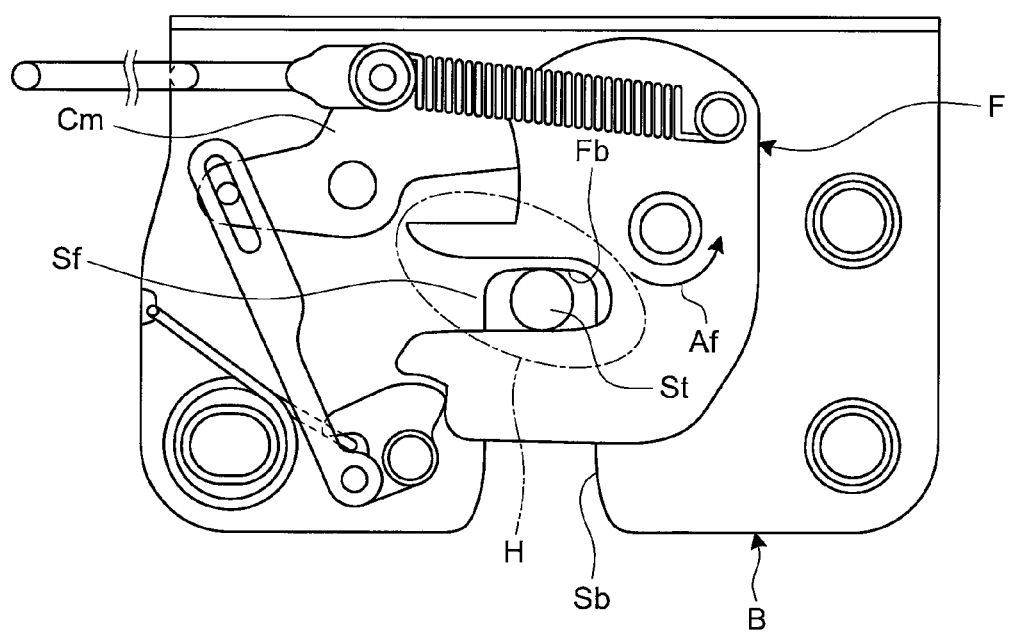
FIG. 18 depicts a restrained position of a conventional latch device.
Figure 19:
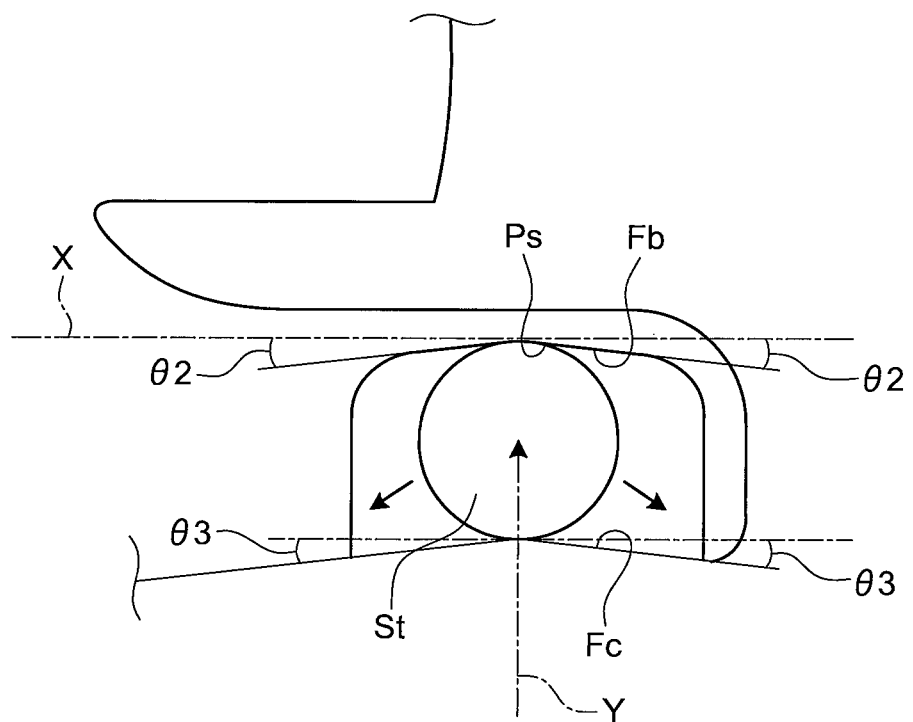
FIG. 19 is an enlarged view of a portion H of the latch device shown in FIG. 18.

FIG. 17 is an enlarged view of a portion G of the latch device shown in FIG. 16. As shown in FIG. 17, the inlet of the engaging groove 3b of the restraining wall Wf of the latch device 1 is inclined at the angle θ1 with respect to the deep side in the restrained position. Therefore, it is possible to restrain the striker ST by the deep side wall Wb and the restraining wall Wf without rotating the latch 3 in the counterclockwise direction additionally by an amount of a distance ΔL generated by inclination of the angle θ1 of the restraining wall Wf of the latch device 1 shown in FIG. 17.

Therefore, a rotation amount of the latch 3 of the latch device 1 according to the present invention in the counterclockwise direction becomes small. Due to this, the constituent elements of the latch device 1 such as the base plate 2 and the cam member 11 can be made small, and thus the latch device can be downsized.

The latch device 1 is mounted on the guide frame provided on the backrest portion SS of the vehicle seat S, and meshes with the striker ST provided on the vehicle body BD, thereby keeping the backrest portion SS in a raised state. Alternatively, the latch device 1 can be provided on the vehicle body BD, and the backrest portion SS can be kept in its raised state by meshing the latch device 1 with the striker ST mounted on the guide frame provided on the backrest portion SS of the vehicle seat S.

According to the present invention, because a distance between the deep side wall and an engaging groove at least in a meshed position becomes narrower toward an inlet side of the engaging groove, it is possible to provide a latch device whose strength is stabilized by regulating a movement of a striker toward an inlet of an engaging groove and by applying an impact force from the striker to the same position of the engaging groove.

This application claims priority from Japanese Patent Application 2010-132398, filed Jun. 9, 2010, which is incorporated herein by reference in its entirety.

What is claimed is:
1. A latch device comprising:
a base member including an entering groove having a deep side wall on a deep side in an entering direction into which a striker is configured to enter;
a latch that is rotatably supported by the base member, and which includes an engaging groove with which the striker is configured to engage, the latch being configured to engage with the striker, thereby rotating the latch from a releasing position to a meshed position where the engaging groove intersects with the entering groove;

a ratchet that is rotatably supported by the base member and configured to mesh with the latch in the meshed position, thereby preventing the latch from rotating in a releasing direction; and a cam member that is rotatably supported by the base member and configured to rotate the latch to a restrained position where the cam member abuts against the latch to nip the striker between the deep side wall and the engaging groove, thereby restraining the striker, wherein:

a distance between the deep side wall and the engaging groove in at least the meshed position becomes narrower toward an inlet side of the engaging groove, a first shaft hole is formed in one end of the ratchet, a locking hole is formed in the other end of the ratchet, a second shaft hole is formed in one end of the cam member, a cam face that abuts against the latch is formed on the other end of the cam member, an opening is formed between the second shaft hole and the cam face, an operating opening is formed in the base member, an operating rod is configured to be locked in the locking hole through the opening, thereby rotating and operating the ratchet, an end of the operating rod is inserted through the operating opening, the ratchet and the cam member are located such that the locking hole of the ratchet and the opening of the cam member are superposed on each other, and the ratchet and the cam member are supported on the base member by shaft members that are inserted through the shaft holes.

* * * * *